(12) United States Patent
Blaschke

(10) Patent No.: US 7,401,535 B2
(45) Date of Patent: Jul. 22, 2008

(54) TWIST-GRIP BICYCLE SHIFTER

(75) Inventor: Georg K. Blaschke, Geldersheim (DE)

(73) Assignee: Sram Deutschland GmbH, Schweinfurt (DE)

( * ) Notice: Subject to any disclaimer, the term of this patent is extended or adjusted under 35 U.S.C. 154(b) by 162 days.

(21) Appl. No.: 10/064,327

(22) Filed: Jul. 2, 2002

(65) Prior Publication Data
US 2003/0000332 A1    Jan. 2, 2003

(30) Foreign Application Priority Data
Jul. 2, 2001    (DE) .............................. 101 32 010

(51) Int. Cl.
*F16C 1/12*    (2006.01)
*B62M 25/04*    (2006.01)
(52) U.S. Cl. ........................ 74/501.6; 74/504
(58) Field of Classification Search ................ 74/501.6, 74/502.2, 504
See application file for complete search history.

(56) References Cited

U.S. PATENT DOCUMENTS

| 4,938,733 | A | * | 7/1990 | Patterson | ...................... 474/80 |
| 5,660,083 | A | * | 8/1997 | Huang et al. | ................ 74/502.2 |
| 6,041,895 | A | * | 3/2000 | Mao | ......................... 188/24.22 |
| 6,209,413 | B1 | * | 4/2001 | Chang | ........................ 74/502.2 |
| 6,513,405 | B1 | * | 2/2003 | Sturmer et al. | ............. 74/501.6 |
| 6,595,894 | B2 | * | 7/2003 | Hanatani | ..................... 475/349 |
| 6,615,688 | B2 | * | 9/2003 | Wessel | ...................... 74/551.9 |
| 6,898,824 | B2 | * | 5/2005 | Zaltron | ......................... 16/430 |
| 2002/0152830 | A1 | * | 10/2002 | Chang | ........................ 74/502.2 |

FOREIGN PATENT DOCUMENTS

DE        19915333 A1    10/2000
WO     WO 00/59775    * 10/2000

* cited by examiner

*Primary Examiner*—Chong H Kim
(74) *Attorney, Agent, or Firm*—Milan Milosevic; Lisa Serdynski

(57) ABSTRACT

A twistshifter mounted about a handlebar. The twist-shifter includes a housing element which may be fixed to the handlebar and an actuating element which may be rotated about the axis of the handlebar tube a predetermined angle. The actuating element may be fixed axially to the housing element by a locking device having interlocking first and second latching elements. The first latching element is arranged on the housing element. The second latching element that is complementary in shape to the first latching element is arranged on the actuating element.

6 Claims, 3 Drawing Sheets

TWIST-GRIP BICYCLE SHIFTER

BACKGROUND OF INVENTION

This invention relates to twist-grip shifters for bicycles in particular a twist-grip shifter having an integrated locking device that connects a housing element and an actuating element of the twist-grip shifter.

Twistshifters are widely used in bicycles of nearly all types and quality classes. The object of such twistshifters is to make it possible for the cyclist to manually select and monitor the desired gear ratio of the bicycle transmission manually in a simple, safe and ergonomic manner. Twistshifters may be used to actuate internal gear hubs or derailleurs. Twistshifters usually include a housing element mounted to the handlebar near the end of the handlebar. Such shifters also include an actuating element that is rotatable about the axis of the handlebar. Both the housing element and the actuating element are generally mounted about the handlebar in the form of a ring. The actuating element is generally provided with a non-slip outer surface made from an elastomer forming a rotatable grip, typically positioned adjacent a stationary grip, both grips located on the handlebar. However, the actuating element of the twistshifter may form the entire handlebar grip.

For safety reasons, the actuating element is secured against undesirable axial movements along the handlebar axis. An actuating element of a twistshifter that is not or inadequately secured against axial movements might otherwise slip off from the end of the handlebar as a consequence of the arm forces transferred to the handlebar via the handlebar grips during cycling, potentially causing dangerous falls. Therefore, it is important to secure the actuating element axially on the handlebar or to the housing element of the twist-grip shifter in an effective and stable manner.

A twistshifter for bicycles is known from German Patent Application 199 15 333 A1 in which the actuating element is axially secured relative to the housing element of the twistshifter by an additional annular locking element positioned at the outer end of the twistshifter, the locking element being provided with a bayonet lock or a snap connection. The manufacture and installation of the locking element, the housing element, and actuating element of the twistshifter and in addition to the necessary complementary-shaped companion parts to be joined to the housing element, is expensive and time-consuming. Moreover, the tools for manufacturing the parts are complex and also expensive. In addition, the discrete locking element may be lost or forgotten during assembly or installation of the twistshifter, resulting in a temporarily functional twistshifter, but one under risk of having the actuating element slide off the handlebar end during use.

SUMMARY OF INVENTION

The object of the present invention is therefore to provide a twistshifter in which the securing of the actuating element to the housing element occurs automatically at the time the actuating element is assembled to the housing element and requires no additional parts such as locking elements required to secure the actuating element to the housing element in an axial direction.

The twistshifter of the present invention has a housing element which may be fixed to the handlebar. The housing element may form a ring. The twistshifter also includes an actuating element which may be rotated about the axis of the handlebar. The angle of rotation of the actuating element is limited. The actuating element may be fixed axially to the housing element by using a locking device having latching elements. A first latching element of the locking device is joined to the housing element or is situated on the housing element. In contrast to the twistshifters of the prior art, a second latching element, does not form an additional part but rather is situated directly on the actuating element itself. This eliminates the need to provide an additional locking part on which it was necessary to arrange the second latching element of complementary shape to the first latching element. The elimination of the additional locking part reduces the cost of tooling, production and assembly. Moreover, the problem of losing or forgetting the locking part during assembly which may adversely affect riding safety is also eliminated.

According to one embodiment of the present invention, both the first and second latching elements are arranged on a circumference of the twistshifter near the handlebar. Arranging the latching elements of the locking device near the handlebar results in increased inherent stiffness of the latching elements in an axial direction in particular, as a result of which the considerable hand and arm forces occurring during cycling may be transferred more reliably to the bicycle handlebar without the danger of axially decoupling the actuating element under use. The arrangement of the latching elements of the locking device on a circumference of the twistshifter near the handlebar surface ensures that once joined, the actuating element may only be detached from the housing element when the twistshifter is removed from the handlebar.

According to another embodiment of the present invention, one of the latching elements of the locking device may have a hook contour while the other latching element forms an undercut having a complementary shape to the latching element formed in the shape of a hook. According to a further embodiment of the present invention, it is provided that the first and second latching elements each extend along circular segments of the circumference of the twist-shifter. The circular segments extending between two radii drawn from the handlebar axis. Each segment describing a distinct angle defined by the two radii. A locking device designed in this manner not only axially secures the actuating element but also defines its angular limits of rotation further simplifying and reducing the manufacturing cost of the twistshifter. The angular difference of the circular segment angle of the two latching elements is selected to achieve the desired maximum angle of rotation of the actuating element.

A latching element may be in the shape of a hook and may be arranged on the housing element or on the actuating element of the twistshifter. Preferably, the hook latching element is arranged on the actuating element, and the other latching element which may form an undercut is arranged on the housing element. The arrangement of the hook latching element on the actuating element has advantages in particular with respect to tool design and mold release. However, it is also advantages for optimum stiffness of securing the locking device in an axial direction and for limitation of its angle of rotation.

To make the installation or assembly of the twistshifter easier and to minimize possible sources of error at the time the actuating element is installed, the twistshifter may be provided with a chamfer complementary in shape to the hook latching element. The chamfer may extend along a segment of the circumference of a mandrel and is configured to receive the hook latching element. When the actuating element is slipped onto the housing element, the chamfer is used to lift and ease the hook latching element into engagement with the undercut of the other latching element. The segment angle of the chamfer may correspond to the segment angle of the hook latching element to predefine their relative angular position upon assembly.

According to another embodiment of the present invention, the projection of the hook latching element is formed by a separately mountable element such as a screw or pin that may be pressed in. A hook latching element designed in this manner simplifies the formation of the housing element or actuating element, resulting in additional cost savings.

These and other features and advantages of the invention will be more fully understood from the following descriptions of certain embodiments of the invention taken together with the accompanying drawings.

DETAILED DESCRIPTION

Figures 1, 2:
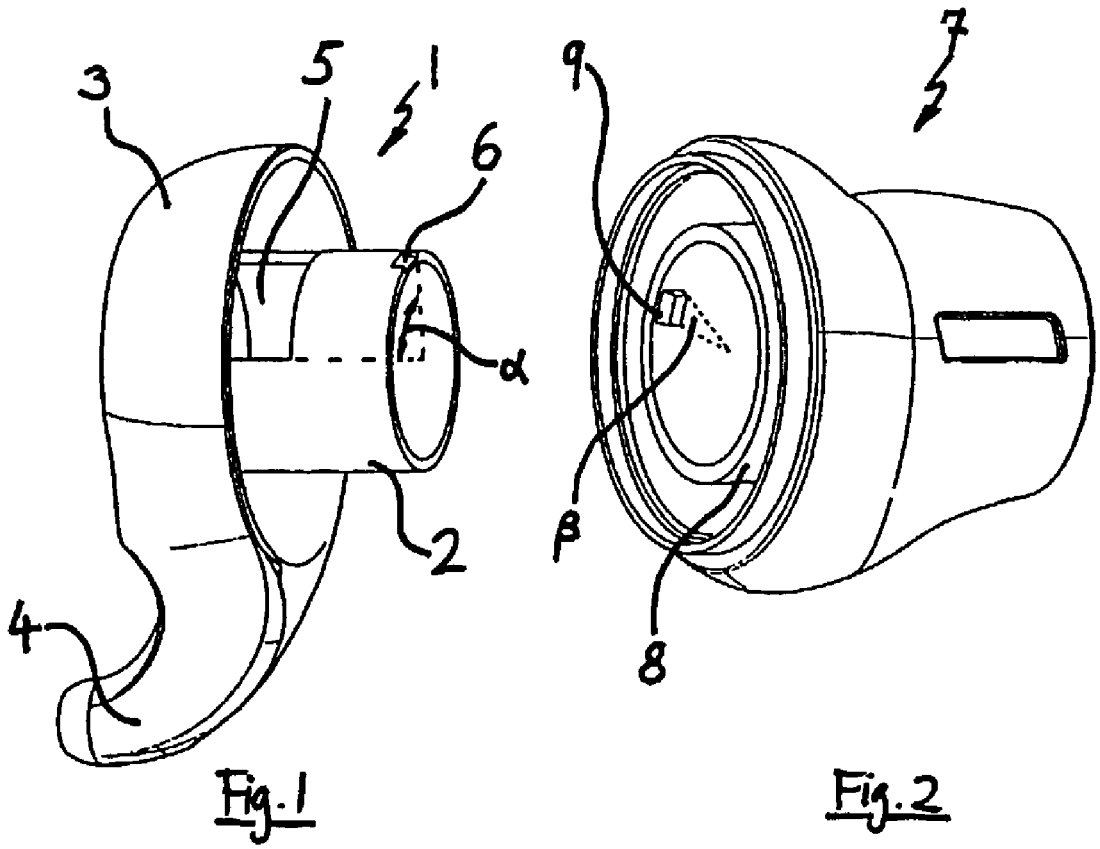
FIG. 1 is a perspective view of a housing element of a twistshifter in accordance one embodiment of the present invention.
FIG. 2 is a perspective view of an actuating element of the twistshifter of FIG. 1.

FIG. 1 shows a housing element of a twistshifter. The housing element 1 includes a mandrel 2 designed as a cylinder, a housing cover 3 and a housing extension 4 for accommodating a cable (not shown). An inside diameter of mandrel 2 is slightly larger than an outer diameter of a handlebar (not shown) so that the housing element 1 may be slipped on an end of the handlebar. The housing element 1 may be fixedly joined to the handlebar by a screw device or clamping device (not shown). In addition, the housing element 1 of the twistshifter includes a cutout recess 5, which forms one of the two latching elements of a locking device to join an actuating element 7 to the housing element 1 of the twistshifter. Moreover, the housing element 1 may include a chamfer 6 to lift a latching element 9 of the actuating element 7 onto the mandrel 2 upon assembly.

Figure 5:
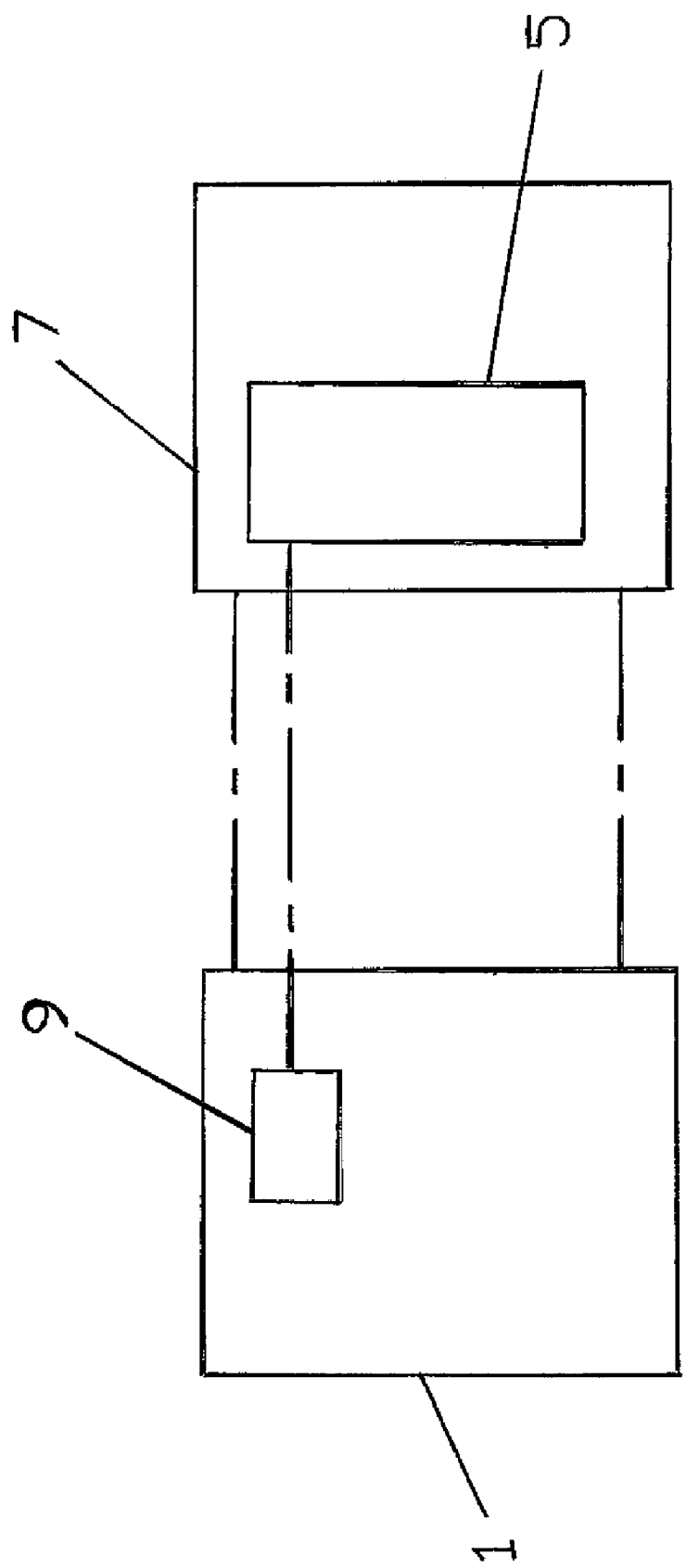
FIG. 5 is a block diagram of a housing element and an actuating element according to another embodiment of the present invention.

Referring now to FIG. 2, the actuating element 7 has a cylindrical interior 8. The inside diameter of the actuating element 7 corresponds to the outside diameter of the cylindrical mandrel 2 of the housing element 1 so that cylindrical interior 8 of the actuating element 7 may be slipped onto the cylindrical mandrel 2 of the housing element 1, resulting in the formation of a sliding support with rotary motion between the actuating element 7 and the housing element 1. In addition, actuating element 7 has a latching element 9 that may be formed in the shape of a hook complementary in shape to recess 5 on the housing element 1 forming the second latching element. In another embodiment of the present invention, the hook 9 is on the housing 1 and the recess 5 is on the actuating element 7 (see FIG. 5).

In order to engage the hook latching element 9 of the actuating element 7 with the cutout latching element 5 of the housing element 1, the hook latching element 9 must first be moved radially outwards from its rest position to override the continuous cylindrical surface of the mandrel 2. The cylindrical mandrel 2 of the housing element 1 may be provided with a chamfer 6 for this purpose. The chamfer 6 and of a ramp of the hook latching element 9 are configured to permit the actuating element 7 to be slipped onto housing element 1 in only one correct angular position, to avoid misalignment of the actuating element 7 relative to the housing element 1 upon assembly.

The size of the respective circular segment angles α, β of the cutout latching element 5 and hook latching element 9, respectively, are such that the cutout latching element 5 and hook latching element 9 limit the angle of rotation of the actuating element 7 to the desired amount. A limitation of the angle of rotation is necessary to avoid overshifting which might result in the bicycle chain jumping off a sprocket or in damage to the shifting mechanism of the internal gear hub. The angle of rotation for the actuating element 7 of the twistshifter may be limited in the embodiment illustrated in a simple manner by selecting circular segment angles α and β of the cutout latching element 5 and the hook latching element 9, respectively, such that their difference corresponds to the desired maximum angle of rotation of the actuating element 7.

Figure 3:
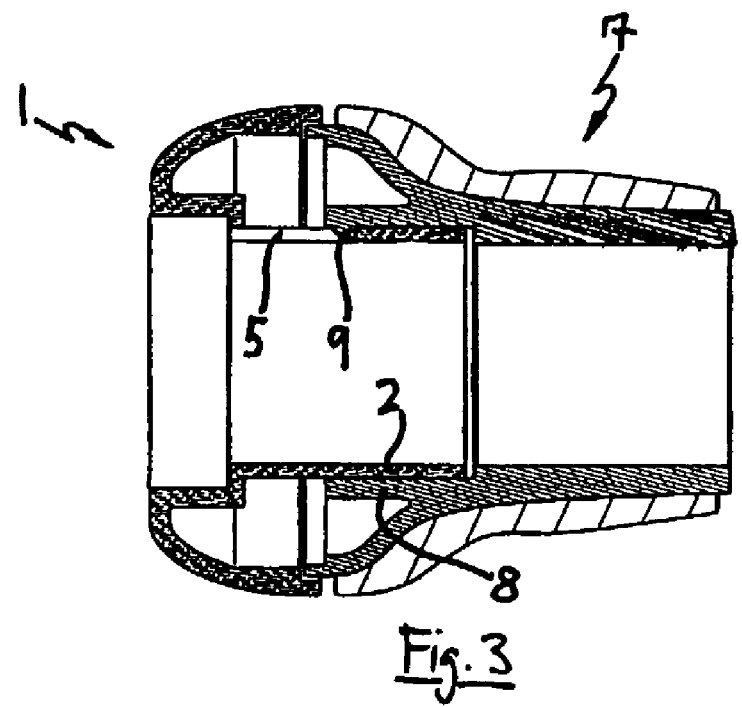
FIG. 3 is a cross-sectional view of the housing element and the actuating element of FIGS. 1 and 2.

FIG. 3 shows a cross section of the twistshifter that includes the housing element 1 and the actuating element 7. Cylindrical interior 8 of actuating element 7 rotates about the cylindrical mandrel 2 of the housing element 1 permitting rotary motion between the actuating element 7 and the housing element 1. Moreover, FIG. 3 depicts the engagement of hook latching element 9 with cutout latching element 5 to secure the actuating element 7 relative to the housing element 1 in an axial direction.

An advantage of forming the latching elements 5, 9 near the handlebar is that the latching elements 5, 9 can only be separated when the twistshifter is removed from the handlebar since the hook latching element 9 is only accessible in the uninstalled condition of the twistshifter. This results improves the safety characteristics of the twistshifter.

Figure 4:
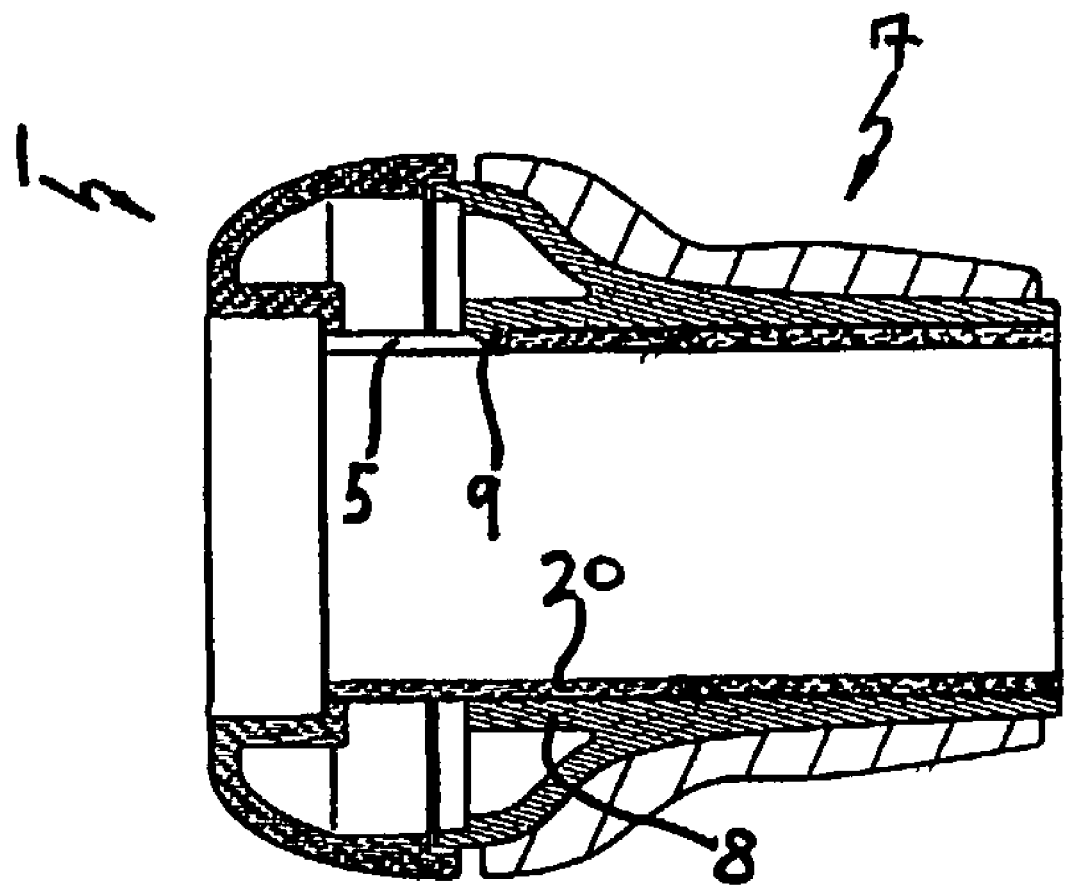
FIG. 4 is a cross-sectional view of an additional embodiment of the present invention illustrating an extended mandrel.

FIG. 4 shows an additional embodiment of the twistshifter wherein an extended mandrel 20 provides additional support along the length of the actuating element 7 to substantially prevent frictional contact between actuating element 7 and the handlebar during use.

While this invention has been described by reference to several embodiments, it should be understood that numerous changes could be made within the spirit and scope of the inventive concepts described. Accordingly, it is intended that the invention not be limited to the disclosed embodiments, but that is have the full scope permitted by the language of the following claims.

The invention claimed is:

1. A twistshifter for a bicycle, the twistshifter comprising:
a housing element mounted about and nonrotatably fixed to the handlebar;
an actuating element rotatable about an axis of the handlebar, the actuating element having a limited angle of rotation; and
a locking device including a first latching element arranged on the housing element and a second latching element having a complementary shape for engagement with the first latching element and arranged on the actuating element, one of the first and second latching elements having a hook contour extending along a segment of a circumference of the twistshifter near the handlebar and the other of the first and second latching elements forming a cutout having a complementary shape to the hook contour and extending through one of the housing element and the actuating element, the hook contour embodying a single piece with the one of the housing and actuating element, the locking device defining the limited angle of rotation of the actuating element.

2. The twistshifter according to claim 1 wherein the first and second latching elements are arranged at a radius of the twistshifter located near the handlebar.

3. The twistshifter according to claim 1 wherein the first and second latching elements extend along two segments of a circumference of the twistshifter, the segments defining angles of different sizes.

4. The twistshifter according to claim 3 wherein the difference between the angles of the segments of the latching elements corresponds to a maximum angle of rotation of the actuating element.

5. The twistshifter according to claim 1 wherein the hook latching element is arranged on the actuating element.

6. The twistshifter according to claim 1 further comprising a chamfer extending along a segment of the circumference of the twistshifter having an angle corresponding to the angle of the segment of the hook latching element.

* * * * *